Figure 1:
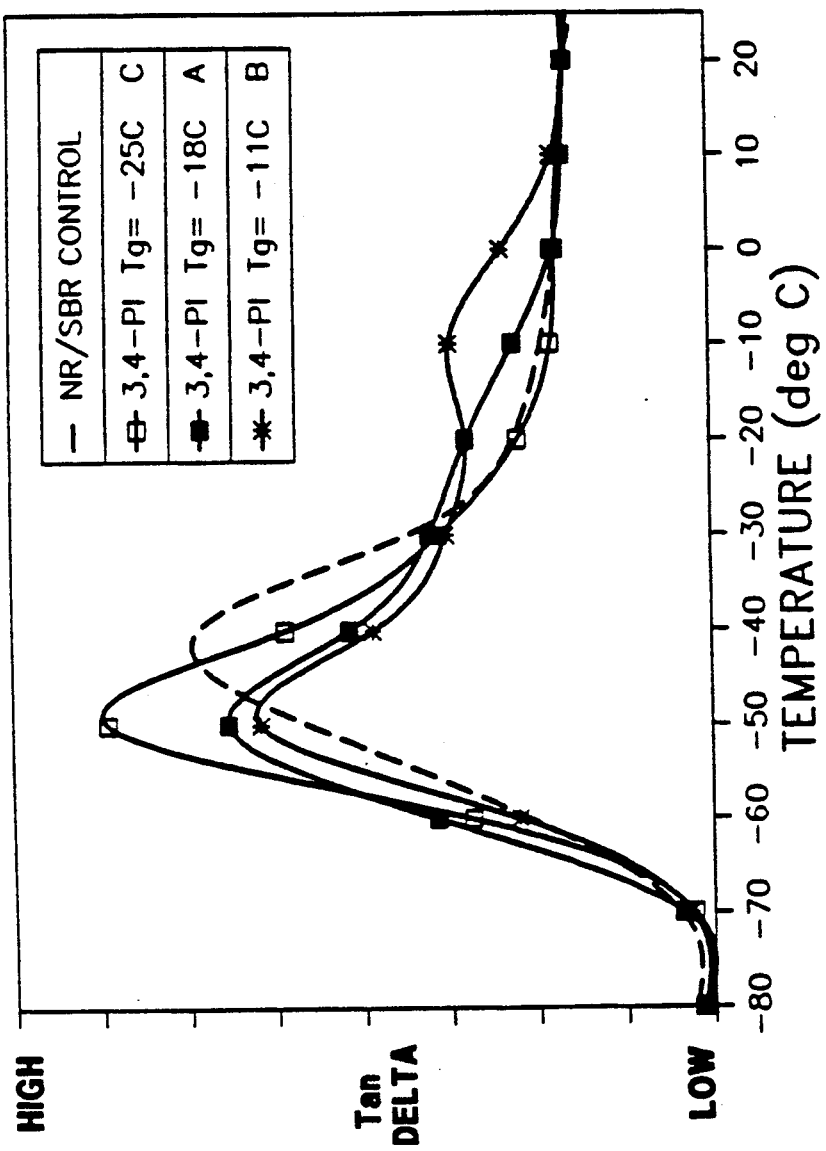

United States Patent [19]

Standstrom et al.

[11] Patent Number: 5,087,668

[45] Date of Patent: Feb. 11, 1992

[54] RUBBER BLEND AND TIRE WITH TREAD THEREOF

[75] Inventors: Paul H. Standstrom, Tallmadge; J. Dale Massie, II, Hudson; John J. A. Verthe; Gregory M. Holtzapple, both of Kent; Raymond R. DiRossi, Akron, all of Ohio

[73] Assignee: The Goodyear Tire & Rubber Company, Akron, Ohio

[21] Appl. No.: 698,007

[22] Filed: May 9, 1991

Related U.S. Application Data

[63] Continuation of Ser. No. 600,381, Oct. 19, 1990, abandoned.

[51] Int. Cl.$^5$ .......................... C08L 9/00; C08L 9/06; C08L 7/00
[52] U.S. Cl. .................................... 525/237; 525/236; 152/209 R
[58] Field of Search ..................... 525/236, 237; 152/209 R

[56] References Cited

U.S. PATENT DOCUMENTS

| | | | |
|---|---|---|---|
| 4,383,085 | 5/1983 | Fujimaki et al. | 525/237 |
| 4,756,353 | 7/1988 | Nordsiek et al. | 525/232 |
| 4,894,425 | 1/1990 | Hellermann et al. | 525/342 |
| 4,946,887 | 8/1990 | Takino et al. | 525/237 |

FOREIGN PATENT DOCUMENTS

| | | |
|---|---|---|
| 3720461 | 12/1988 | Fed. Rep. of Germany . |
| 58-196245 | 11/1983 | Japan . |
| 59-96143 | 6/1984 | Japan . |
| 59-210958 | 11/1984 | Japan . |
| 62-104847 | 5/1987 | Japan . |
| 1158056 | 12/1987 | Japan . |

OTHER PUBLICATIONS

Abstracts of Japanese 88-4, 578—Date 1/88—Dewent Class A12; A95—Assignee (Asahi Chem.).

Primary Examiner—Carman J. Seccuro
Attorney, Agent, or Firm—Henry C. Young, Jr.

[57] ABSTRACT

A pneumatic tire with a tread composed of a blend of 3,4-polyisoprene rubber, cis 1,4 polyisoprene rubber and at least one additional diene based rubber.

16 Claims, 3 Drawing Sheets

FIG. 2

Tan DELTA at 60 C

| | NR/SBR CTRL | Tg= -25C  C | Tg= -18C  A | Tg= -11C  B |
|---|---|---|---|---|
| 60 C | 0.174 | 0.143 | 0.146 | 0.152 |

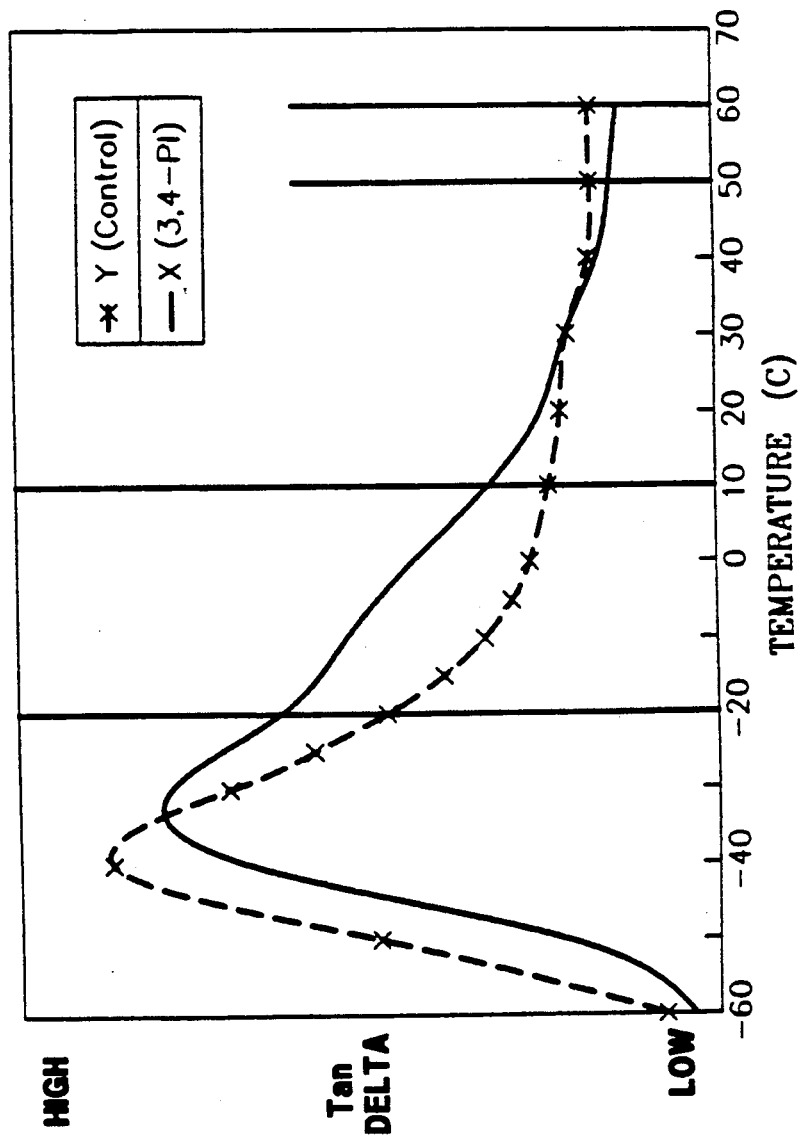

5,087,668

RUBBER BLEND AND TIRE WITH TREAD THEREOF

This is a continuation of application Ser. No. 07/600,381, filed on Oct. 19, 1990, now abandoned.

FIELD

This invention relates to a pneumatic tire with a tread composed of a blend of at least three rubbers including 3,4-polyisoprene rubber, cis 1,4-polyisoprene rubber and at least one additional diene-based rubber.

BACKGROUND

Pneumatic rubber passenger and truck tires are composed of elements which conventionally include a tread of a rubber composition. The tread rubber is sometimes desirably compounded to provide a tire with a relatively low rolling resistance with reasonable wear and traction.

Although it may be desired to compound the tire's tread composition to reduce the rolling resistance of the tire without substantially reducing the tire's traction features, tire traction might be expected to be somewhat sacrificed as may be evidenced by its decrease in wet and dry skid resistance.

Various rubber compositions have been prepared for various purposes, some of which have included the tire treads. Often tire treads are composed of synthetic rubber or blends of synthetic rubber with natural rubber for the purpose of achieving desirable tire tread characteristics such as wear, traction and reduction in rolling resistance. Various synthetic rubbers have been used in the manufacture of tires with such treads including styrene/butadiene copolymers (prepared by emulsion or solution polymerization methods) sometimes referred to as SBR, high cis 1,4 polybutadiene rubber as well as high and medium vinyl (1,2-) polybutadiene rubbers. Sometimes a synthetic cis 1,4-polyisoprene may, at least in part, be substituted for the natural rubber in tire tread compositions.

Vinyl isoprene (3,4-polyisoprene) rubber has heretofore been taught to be useful for various purposes such as, for example, as a blend with other rubber in tire treads and use in industrial products such as vibration dampers, belts and shoe soles.

Representative of various patent and patent application disclosures are JP (Japan); 58-196,245; 59-96,143; 59-210,958; 62-104,847; 88-4,578; and 1-158,056; GE (Germany) 3,707,434; 3,720,461; 3,835,792 and P38-35-792.5; and U.S. Pat. No. 4,383,085 and 4,756,353.

Viscoelastics properties of a rubber, or a rubber blend, for a tire tread applications, are important. For example, a tan.delta property is the ratio of the viscous contribution to the elastic contribution for a viscoelastic rubber subjected to a dynamic deformation. Such property is typically represented in the form of a curve as a plot of tan.delta values versus temperature.

For a tire with a low rolling resistance, a tread rubber with tan.delta optimization for a temperature in the range of about 50° C. to about 60° C. is desired and a tan.delta optimization for a temperature range of about −20° C. to about +10° C. is desired for a tire with good wet skid resistance. It is difficult to adjust a rubber blend to achieve a tan.delta optimization substantially simultaneously for both temperature ranges and, thus, for both rolling resistance and wet skid resistance at the same time. Often, compromises have to be made.

By tan.delta optimization it is meant that the tan.delta value for the rubber, or rubber blend, is maximized in the region of approximately −20° C. to about +10° C. for a tire tread to have high wet skid resistance and tan.delta value is minimized in the region of about 60° C. for a tire tread to have low rolling resistance.

Although various rubber compositions are taught to provide various benefits, some for tire treads, it continues to be desirable to provide a pneumatic tire having a rubber tread having an enhanced rolling resistance and/or treadwear commensurate with reasonable traction qualities.

DISCLOSURE AND PRACTICE OF INVENTION

In accordance with this invention, a pneumatic tire is provided having an outer circumferential tread where said tread is a sulfur cured rubber composition composed of, based on 100 parts by weight rubber (phr); (A) about 5 to about 35, preferably about 10 to about 25 parts by weight 3,4-polyisoprene rubber; (B) about 20 to about 60, preferably about 30 to about 55 parts by weight cis 1,4-polyisoprene rubber; and (C) about 10 to about 50 parts by weight of at least one other rubber selected from at least one of solution polymerization formed styrene/butadiene copolymer rubber having a styrene/butadiene ratio in the range of about 5/95 to about 30/70, preferably about 8/92 to about 25/75, emulsion polymerization formed styrene/butadiene copolymer rubber having a styrene/butadiene ratio in the range of about 10/90 to about 60/40, preferably about 15/85 to about 35/65, cis 1,4-polybutadiene rubber, isoprene/butadiene copolymer rubber having an isoprene/butadiene ration in a range of about 30/70 to about 70/30, styrene/isoprene rubber having a styrene/isoprene ratio in a range of about 10/90 to about 35/65, and styrene/isoprene/butadiene rubber; wherein said 3,4-polyisoprene rubber, in its uncured state, is characterized by having a glass transition temperature (Tg) in the range of about −15° C. to about −20° C. a Mooney (ML1+4) value in the range of about 70 to about 90, preferably about 75 to about 85, and, further, a polymer structure containing about 40 to about 70 percent, preferably about 50 to about 60 percent, 3,4-vinyl isoprene units, about 30 to about 50 percent, 1,4-cis and trans units and about 2 to about 10 percent 1,2-isoprene units with the total of its 3,4- and 1,2 units being in the range of about 56 to about 63 percent.

In further accordance with this invention, the rubber composition itself is contemplated.

The term "Tg" refers to the glass transition of the identified rubber and is suitably determined by a differential scanning calorimeter at a rate of 1° C. per minute.

Thus, the tread rubber is required to be a blend of at least three rubbers.

Preferably, the cis 1,4-polyisoprene rubber (B) is natural rubber.

Preferably, said other rubber (C) is selected from at least one of the solution polymerization prepared styrene/butadiene copolymer rubber and the isoprene/butadiene copolymer rubber.

In contemplated embodiments, such tread may be composed of, based on 100 parts by weight rubber, (A) a tri-rubber blend comprised of about 40 to 60 parts (by weight) natural rubber, about 30–40 parts styrene/butadiene copolymer rubber (preferably solution polymerization derived copolymer, sometimes referred to herein as S-SBR) and about 5–20 parts of 3,4-polyisoprene rubber as prescribed herein; (B) a quatra-rubber blend comprised of about 30 to 50 parts natural rubber, about 20 to 40 parts cis 1,4-polybutadiene rubber, about 10 to 30 parts isoprene/butadiene copolymer rubber and about 5 to 15 parts 3,4-polyisoprene rubber as prescribed herein; or (C) a quatra-rubber blend comprised of about 30 to 40 parts natural rubber, about 20 to 40 parts S-SBR, about 5 to 20 parts cis 1,4-polybutadiene rubber and about 10 to 20 parts 3,4-polyisoprene as prescribed herein.

It is an important feature of this invention that a specified 3,4-polyisoprene rubber is used with the prescribed characteristics, particularly its Tg and Mooney (ML1+4) viscosity limitations and, further, that the prescribed 3,4-polyisoprene is utilized as a minor component with selected other rubbers in a tire tread composition and that the 3,4-polyisoprene rubber is relatively incompatible with the other rubbers in the tread composition.

The mooney (ML1+4) value in a range of about 70 to 90, preferably about 75 to about 85, for the 3,4-polyisoprene in combination with the required Tg range is considered to be important.

For processibility of the 3,4-polyisoprene rubber it would ordinarily by desirable for the rubber to have a relatively low Mooney (ML1+4) value which is a measure of its viscosity and, on a relative basis, of its molecular weight.

However, for a purpose of achieving the desired low tan.delta for the rubber blend in the region of 60° C., indicating a low hysterisis of the rubber blend and predicting a low rolling resistance for a tire with tread of such rubber blend as well as good abrasion resistance for the rubber blend in its compounded, sulfur cured condition, a higher molecular weight 3,4-polyisoprene polymer is required and, thus, one with the higher Mooney (ML1+4) value prescribed for the 3,4-polyisoprene rubber used in this invention.

Therefore, for the purpose of this invention, the relatively narrow Tg and Mooney (ML1+4) ranges of values are prescribed in combination with the specified 3,4- 1,2- and 1,4-contents, including the relatively narrowly defined total of 3,4- and 1,2-units being from 56 to 63 percent.

The ML(1+4) is a measure or value well known to those skilled in such art and typically determined by a Mooney Disk Viscometer.

It is to be appreciated that the 3,4-polyisoprene rubber for this invention is required to have the aforesaid characteristics for preparing a tire tread to enable a tire to have good treadwear and low rolling resistance. Therefore, the rubber is required to have a relatively high molecular weight, or Mooney (ML1+4) value while still possessing a reasonably good processability. The good processability of the rubber is a desirable feature so long as the aforesaid good rolling resistance and treadwear of the tire is not appreciably compromised.

It is preferred that the 3,4- polyisoprene, by having the defined physical Tg characteristic, is relatively incompatible in the rubber tread blend. By being incompatible, it is meant that the 3,4-polyisoprene rubber individually displays a second, or additional, tan.delta hump, or upward bend of the curve, in addition to the tan.delta peak for the diene rubbers (B) and (C), which appears when the 3,4-polyisoprene is blended with rubbers (B) and (C), as evidenced by the viscoelastic response of the cured blend to a dynamic deformation.

For further description and understanding of this invention, reference is made to the accompanying drawings.

FIG. 1 demonstrates a viscoelastic property of 3,4-polyisoprene rubbers of microstructures represented by their Tg's of −11° C., −18° C. and −25° C., respectively, blended with cis 1,4-polyisoprene rubber (natural rubber). It represents the relationships between tan.delta versus temperature for the three sulfur cured rubber blends for a temperature range of −80° C. to +20° C. and compares them to a sulfur cured natural rubber/styrene-butadiene control rubber composition.

FIG. 2 is a table demonstrating the determined tan.delta for the respective sulfur cured rubber blends of FIG. 1 at 60° C.

FIG. 3 demonstrates the tan.delta curve for temperatures in the range of −60° C. to +60° C. for a sulfur cured blend of 15 parts 3,4-polyisoprene having a Tg of −18° C., 55 parts natural rubber and 30 parts S-SBR (identified as X(3,4 PI) and compares it to a control of a sulfur cured blend of 50 parts natural rubber and 50 parts S-SBR (identified as Y(Control).

Referring to FIG. 1, curves are shown for three sulfur cured rubber blends of 3,4-polyisoprene rubber and natural rubber, identified as experimental blend (A) experimental blend (B) and experimental blend (C) with the Tg's of the 3,4-polyisoprene being −18° C., −11° C., and −25° C. respectively, as referenced in the following table where 3,4-PI refers to the 3,4-polyisoprene rubber containing sulfur cure blends. Each blend was a sulfur cured compounded blend composed of 25 parts by weight 3,4 polyisoprene, and 75 parts by weight natural rubber.

| Rubber Blends | |
|---|---|
| Blend Identification | Tg of 3,4-polyisoprene |
| 1. Experimental (A) | −18° C. |
| 2. Experimental (B) | −11° C. |
| 3. Experimental (C) | −25° C. |

The curves of FIG. 1 taken with the data of FIG. 2, demonstrate that a tan.delta curve with a maximization in the range of −20° C. to +10° C. coupled with a minimization in the 60° C. region (shown in FIG. 2) for the dual rubber blend is accomplished with a 3,4 polyisoprene having a Tg of −18° C., thus, indicating that the 3,4-polyisoprene with a Tg of about −18° C. is the preferable rubber for the purposes of the tri-rubber and quatra-rubber blends of this invention.

Thus, only compound (A) demonstrated optimized tan.delta curves for both the 60° C. and the −20° C. to +10° C. ranges, thus, indicating the desirability of utilizing the 3,4-polyisoprene with a Tg of about −18° C.

Three pneumatic rubber tires having treads composed of individual sulfur cured compounded blends of the 3,4-polyisoprene rubbers having Tg's of −11° C., −18° C. and −25° C. plus cis 1,4-polyisoprene rubber (natural rubber) in a 25/75 ratio were prepared and tested for wet traction, or skid resistance, (20 mph) and for rolling resistance. The results are shown in the following table and compared with a control tire with a tread composed of a sulfur cured compounded blend of natural rubber and S-SBR in a 50/50 ratio:

| | TIRE PROPERTIES | | |
|---|---|---|---|
| Properties | Control Tire | Experimental Tires | |
| Tg of 3,4-Polyisoprene | | −11° C.  −18° C.  −25° C. | |
| Rolling Resistance[1] | 100 | 102   106   110 | |
| Wet Traction | 100 | 108   104   101 | |
| Treadwear[2] | 100 | —   80   — | |

[1] An increase of the normalized value reflects a reduction in rolling resistance which is considered an improvement.
[2] Data not taken for treadwear for −11° C. and −25° C. Tg 3,4-polyisoprene containing tire treads.

The values for the tire properties for the control tire were normalized to a value of 100 and the properties of the experimental tire were compared to the control tire's values.

While the dual rubber blend, utilizing the 3,4 polyisoprene with a Tg of −18° C., demonstrated enhanced properties as shown in the preceding table, it also demonstrated certain disadvantages for use as a tire tread, namely, upon tire test with a tread composed of such a dual rubber blend, an inadequate treadwear was observed.

Consequently, a tri-blend of rubbers was prepared and sulfur cured. The results are depicted in FIG. 3 which shows that a similar and desirable tan.delta curve is obtained with suitable maximum and minimum values if the 3,4 polyisoprene having a Tg of −18° C. is used. Subsequent tire tests with such a tri-rubber blend for its tread yielded a tire with adequate treadwear.

More specifically, referring to FIG. 3, tan.delta versus temperature curves are shown for sulfur cured rubber tri-blends of 3,4-polyisoprene rubber having the Tg of −18° C., cis 1,4-polyisoprene natural rubber and S-SBR rubber, identified as experimental blend X, and a sulfur cured control rubber blend Y. Blend X was a sulfur cured blend of 55 parts by weight cis 1,4-polyisoprene natural rubber, 30 parts by weight solution polymerization prepared styrene/butadiene rubber with about 10 percent styrene, and 15 parts by weight 3,4 polyisoprene rubber required by this invention and having a Tg of −18° C. Control blend Y was 50 parts by weight cis 1,4 polyisoprene natural rubber and 50 parts solution polymerization prepared styrene/butadiene copolymer rubber containing about 10 percent styrene.

The curves of FIG. 3 demonstrate that the tri-blend sulfur cured rubber composition has a tan.delta curve maximization in the range of −20° C. to +10° C. and a minimization in the range of about 50° C. to about 60° C. The curve also exhibits a tan.delta peak in the region of about −60° C. to about −30° C. and a second tan.delta hump in the region of about −20° C. to about +10° C. indicating that the 3,4-polyisoprene is substantially incompatible with the remaining rubbers of the blend. The departure of the curve in the −20° C. to +10° C. region from a smooth curve to a curve containing an upward bend demonstrates the relative incompatibility.

For some applications, it has further been found to be practical to utilize a pneumatic rubber tire with a quatra-rubber blend for its tread to more completely optimize rolling resistance, traction and treadwear including winter tire performance.

While the contribution of various elements or components of a composition are not always completely understood, it is considered that an important and significant component of the blend is the specified 3,4 polyisoprene with its Tg of about −18° C. together with its Mooney viscosity limitation properties which apparently provides unique viscoelastic properties when combined with the remainder of the rubbers (B) and (C), particularly as compounded sulfur cured tri-rubber and quatra-rubber blends for tire treads.

The samples of the sulfur cured rubber blends for FIG. 1 were tested by Rheometrics Viscometer System IV dynamic viscoelastic tester, obtained from the Rheometrics Company, to determine the relationship between tan.delta and temperature from −80° C. to +25° C. During the test, the samples are maintained under tension (0.5% strain) and a cyclic deformation is applied to the sample at a frequency rate of one hertz. The viscoelastic tester measures the response of the sample to the applied deformation and calculates the tan.delta values at the desired temperatures.

The samples of sulfur cured rubber blends were also tested for FIG. 2 by a Rheovibron dynamic viscoelastic tester, an instrument provided by Imass, Inc., to determine their tan.deltas at 60° C.

Samples of cured rubber blends were tested for FIG. 3 by an Autovibron automated dynamic viscoelastic tester, an instrument provided by Imass, Inc., to determine the relationship of tan.delta versus temperature from −60° C. to +60° C. for the indicated rubber blend containing the 3,4-polyisoprene rubber with the Tg of −18° C. A tension (strain) of 0.1% and frequency of 11 hertz was used.

The objective for these tests is to measure the viscoelastic response to an applied deformation of a cured rubber sample under tension at a specified strain, frequency and temperature, or temperature range. The viscoelastic response is used by the instrument to determine the storage modulus, E′, which is a measure of energy stored and recovered in cyclic deformation, and the loss modulus, E″, which is a measure of energy dissipated as heat. The ratio of E″/E′ is the tan.delta for a particular temperature.

Thus, in effect, the tan.delta is a measure of a compound's viscoelastic character and has been observed to relate to tire tread performance. The tan.delta versus temperature characterization of rubbers is well known to those having skill in such art.

As pointed out, in practice it has been observed that, for pneumatic rubber tires, a high tan.delta in the region of −20° C. to +10° C. is desirable for a tire tread to provide a tire with good wet traction while a low tan.delta in the region of 50° c. to 60° C. is desirable for a tire tread to provide a tire with good rolling resistance.

The curve for experimental tread rubber (A) of FIG. 1, taken with the data of FIG. 2, exhibits a high tan.delta in the region of −20° c. to +10° C., thus, predictably suitable for providing a tire with good wet traction and a low tan.delta in the region of 60° C., thus, predictably suitable for a tire with good rolling resistance for this rubber blend.

The importance of such phenomenon is that the rubber blend of this invention enables a relative optimization of the property of tan.delta for prescribed temperatures while also maintaining or even optimizing the property of a tire's rolling resistance and wet skid resistance.

Conversely, the curve for rubber (B) of FIG. 1 taken with FIG. 2 for the 3,4-polyisoprene having a Tg of −11° C. shows a higher tan.delta in the −20° C. to +10° C. range, thus, predicting a tread with better traction than (A) and a tan.delta in the 60° C. range being higher than curve (A) predicting higher tire rolling resistance, as compared to curve (A), for this rubber blend.

Also conversely, the curve (C) of FIG. 1 taken with FIG. 2 for a 3,4-polyisoprene with Tg of −25° C. shows a lower tan.delta in the 60° C. temperature range but a lower tan.delta at the −20° C. to +10° C. predicting a lower tire rolling resistance with lower wet tread traction for this rubber blend.

The advantages of such dual optimization are several fold, particularly including rolling resistance and skid resistance.

In the description of this invention, while the cis 1,4-polyisoprene rubber includes both natural and synthetic rubber, as pointed out, the natural rubber is preferred. The cis 1,4-polyisoprene rubber, natural or synthetic, typically has a cis 1,4-content of about 96 to about 99 weight percent.

The polybutadiene rubber can be composed of about 95 percent or more of cis 1,4 structure when prepared with Ziegler-type catalyst or can be composed at least about 90 percent cis and trans 1,4 structure when prepared with alkyl lithium catalyst. Such polybutadiene rubbers are well known.

The terms butadiene and polybutadiene as used herein refer to 1,3-butadiene and polymers derived from 1,3-butadiene, respectively.

The solution polymerization prepared styrene/butadiene copolymer rubber (S-SBR) can be prepared by copolymerizing styrene and butadiene in an organic solvent in the presence of a suitable catalyst. It typically has a substantially narrower average molecular weight distribution than an emulsion polymerization prepared styrene/butadiene copolymer rubber (E-SBR) and, further, typically enhances or improves a tire's treadwear and rolling resistance when used as a rubber component of a tire tread.

The emulsion polymerization prepared styrene/butadiene rubber is prepared as an emulsion polymerization and sometimes referred to herein as E-SBR.

Both the S-SBR and E-SBR are well known rubbers as is their differences in molecular weight distributions.

As an embodiment of the invention, particularly for tires to be used for somewhat conventional loads and speeds such as passenger vehicle tires, although the embodiment is not necessarily limited to such use, is a pneumatic tire provided with such tread where said tread is a sulfur cured rubber composition comprised of, based on 100 parts by weight rubber, (A) about 10 to about 25 phr of the 3,4-polyisoprene; (B) about 40 to about 55 phr of said natural rubber; and (C) about 10 to about 50 phr of at least one of isoprene/butadiene copolymer rubber and styrene/butadiene rubber, preferably solution polymerization prepared styrene/butadiene rubber, and cis 1,4-polybutadiene rubber and styrene/isoprene/butadiene terpolymer rubber.

Other exemplary embodiments can be such tire with tread composed of rubber blend embodiments hereinbefore exemplified.

Such pneumatic tires are conventionally comprised of a generally toroidal shaped carcass with an outer circumferential tread, adapted to be ground contacting, spaced beads and sidewalls extending radially from and connecting said tread to said beads.

The required 3,4-polyisoprene rubber for the rubber components of this invention can suitably be prepared by polymerizing isoprene, preferably on a continuous reactor basis in the presence of an organo lithium catalyst, such as butyl lithium, in an organic solvent, such as, for example, hexane, and a polar modifier, such as tetramethylethylene diamine (TMEDA) and the polymerization shortstopped with triisopropanol amine, rosin acid, methanol or other suitable shortstop to obtain the required Tg.

The amount of organo lithium catalyst is largely dependent upon the molecular weight desired for the resultant polymer.

As hereinbefore represented in the accompanying drawing, several 3,4-polyisoprene rubber polymers were prepared with various polymer configurations (Tg's, etc.) and blended with various other rubbers in order to achieve the present invention. Accordingly, it was considered that the 3,4-polyisoprene rubber have a Tg in the range of about −15° C. to about −20° C. in order to provide a micro structure for the tire tread for wet traction; a Mooney (ML1+4) value in the range of about 70 to about 90, preferably about 75 to about 85 in order to contribute to lower heat generation for the tread tri-rubber blend or quatra-rubber blend and, thus, lower rolling resistance; a 3,4-content in the range of about 50 to about 60 in order to provide microstructure for polymer incompatibility with other rubbers in the blend and, thus, improve wet traction for the tire tread; a 1,2-content in the range of about 2 to about 10 in order to also assist in providing microstructure for the tire tread's wet traction and a sum of the 3,4 and 1,2 (vinyl) contents in the range of about 56 to about 63 in order to aid in providing an incompatibility factor for the (B) and (C) rubbers in the tire tread to enhance its wet traction.

The prescribed 3,4-polyisoprene rubber is used in a minor amount (less than about 35 phr) of the rubber composition for the tread. Its primary contribution relates to enhancing traction, particularly wet traction for the tread. Larger amounts of the rubber would be expected, or has been observed, to increase rolling resistance and decrease tear resistance of the tire tread.

The other rubbers are utilized as the major portion of the tread rubber because the natural rubber contributes to low rolling resistance and treadwear and the third and fourth rubber(s) of the tri-blend and quatra-blend generally contribute(s) to wet traction and treadwear.

While the rubbers used herein, particularly those in the higher Mooney (ML1+4) viscosity range, can optionally be individually oil extended before or during mixing with various rubber compounding materials for ease of processing; it is preferred in the practice of this invention that oil extension is not used. If oil extension is used, usually about 10 to about 50 phr of rubber processing oil is used, usually of the aromatic or aromatic/napthenic oil type or paraffinic/napthenic oil type.

It should readily be understood by one having skill in the art that said tread portion of the pneumatic tire as well as the rubber or other material in the basic carcass, which normally contains reinforcing elements in the tread region, can be compounded by methods generally known in the rubber compounding art, such as mixing the various sulfur-vulcanizable constituent rubbers with various commonly used additive materials such as, for example, curing aids, such as sulfur, activators, retarders and accelerators, processing additives, such as oils, resins including tackifying resins, silicas, and plasticizers, fillers, pigments, stearic acid, zinc oxide, waxes, antioxidants and antiozonants, peptizing agents and reinforcing materials such as, for example, carbon black. As known to those skilled in the art, depending on the intended use of the sulfur vulcanizable and sulfur vulcanized material (rubbers), the certain additives mentioned above are selected and commonly used in conventional amounts.

Typical additions of carbon black comprise about 20 to 100 parts by weight of diene rubber (phr), preferably 30 to 60 phr. Typical amounts of tackifier resins, if used, comprise about 0.5 to 10 phr. Typical amounts of processing aids comprise 1 to 5 phr. Typical amounts of silica, if used, comprise about 5 to about 25 phr and amounts of silica coupler, if used, comprise about 0.05 to about 0.25 parts per part of silica, by weight. Representative silicas may be, for example, hydrated amorphous silicas. A representative coupling agent may be, for example, a bifunctional sulfur containing organo silane such as, for example, bis-(3-triethoxy-silylpropyl) tetrasulfide, bis-(3-trimethoxy-silylpropyl)tetrasulfide and bis(3-triethoxy-silylpropyl)tetrasulfide grafted silica from DeGussa, AG. Typical amounts of antioxidants comprise 1 to about 5 phr. Representative antioxidants may be, for example, diphenyl-p-phenylenediamine and others, such as those disclosed in the *Vanderbilt Rubber Handbook* (1978), pages 344–346. Suitable antiozanant(s) and waxes, particular microcrystalline waxes, may be of the type shown in the *Vanderbilt Rubber Handbook* (1978), pages 346–347. Typical amounts of antiozonants comprise 1 to about 5 phr. Typical amounts of stearic acid comprise 1 to about 3 phr. Typical amounts of zinc oxide comprise 2 to 5 phr. Typical amounts of waxes comprise 1 to 5 phr. Typical amounts of peptizers comprise 0.1 to 1 phr. The presence and relative amounts of the above additives are not an aspect of the present invention which is primarily directed to the utilization of specified blends of rubbers in tire treads as sulfur vulcanizable compositions.

The vulcanization is conducted in the presence of a sulfur vulcanizing agent. Examples of suitable sulfur vulcanizing agents include elemental sulfur (free sulfur) or sulfur donating vulcanizing agents, for example, an amine disulfide, polymeric polysulfide or sulfur olefin adducts. Preferably, the sulfur vulcanizing agent is elemental sulfur. As known to those skilled in the art, sulfur vulcanizing agents are used in an amount ranging from about 0.5 to 8 phr with a range of from 1.5 to 2.25 being preferred.

Accelerators are used to control the time and/or temperature required for vulcanization and to improve the properties of the vulcanizate. In one embodiment, a single accelerator system may be used, i.e., primary accelerator. Conventionally, a primary accelerator is used in amounts ranging from about 0.5 to 2.0 phr. In another embodiment, combinations of two or more accelerators which is generally used in the larger amount (0.5 to 1.0 phr), and a secondary accelerator which is generally used in smaller amounts (0.05 –0.50 phr) in order to activate and to improve the properties of the vulcanizate. Combinations of such accelerators have historically been known to produce a synergistic effect of the final properties of sulfur cured rubbers and are often somewhat better than those produced by use of either accelerator alone. In addition, delayed action accelerators may be used which are less effected by normal processing temperatures but produce satisfactory cures at ordinary vulcanization temperatures. Representative examples of accelerators include amines, disulfides, guanidines, thioureas, thiazoles, thiurams, sulfenamides, dithiocarbamates and xanthates. Preferably, the primary accelerator is a sulfenamide. If a second accelerator is used, the secondary accelerator is preferably a guanidine, dithiocarbamate or thiuram compound.

The tire can be built, shaped, molded and cured by various methods which will be readily apparent to those having skill in the art.

In the practice of this invention, the polymer blend-tread can be integral with and adhered to various tire carcass substrate rubber compositions. Typically, such a rubber composition is at least one of a butadiene/styrene copolymer rubber, cis 1,4 polyisoprene (natural or synthetic rubber) and 1,4 polybutadiene. Optionally, such a blend for a portion of the tread, particularly where the tread is in the region of the sidewall area of the tire may contain one or more butyl rubber, halobutyl rubber, such as chlorobutyl or bromobutyl rubber, and ethylene/propylene/conjugated diene terpolymer rubber, polyisoprene and polybutadiene rubber.

In the further practice of this invention, the tread can typically be applied in the building of the green tire in which the uncured, shaped tread is built onto the carcass following which the green tire is shaped and cured.

Alternately, the tread can be applied to a cured tire carcass from which the previous tread has been buffed or abraded away and the tread cured thereon as a retread.

As previously discussed, an important contribution of the prescribed 3,4-polyisoprene rubber for the tire tread component is attributed to the increase of wet skid resistance for the tread tri-blend or quatra-blend with minimal increase in rolling resistance due to its relatively high molecular weight as evidenced by its relatively high Mooney (ML1+4) value. A contribution of the natural rubber for the tire tread component is attributed to a lower rolling resistance and to treadwear and to an improved tear resistance. A contribution of the additional diene rubber is attributed to some of the traction, treadwear and/or rolling resistance for the tire.

The practice of this invention is further illustrated by reference to the following examples which are intended to be representative rather than restrictive of the scope of the invention. Unless otherwise indicated, all parts and percentages are by weight.

EXAMPLE I

Pneumatic tires of conventional construction (grooved tread, sidewalls, spaced beads, and supporting fabric-reinforced carcass) were built, shaped and cured in a conventional tire mold. The tread was built onto the uncured carcass as a pre-extruded element. The tires were of the P195/75R14 type which indicates that they were belted, radial ply passenger type tires.

One tire is identified herein as Control X and an experimental tire identified as Experimental Y.

Control tire X had a tread composed of (A) 50 phr butadiene/styrene rubber; and (B) 50 phr natural rubber and is intended to represent a somewhat conventional passenger tire tread.

Experimental tire Y had a thread composed of (A) 3,4-polyisoprene rubber prescribed herein and having a Tg of about −18° C., and a vinyl 3,4-content of about 55 percent; (B) natural rubber; and (C) S-SBR.

Thus, the 3,4-polyisoprene rubber, basically, replaced at least a part of the butadiene/styrene rubber in the tread rubber blend.

The tires (X and Y) were mounted on rims, inflated and submitted to testing. The test values for the control were normalized to a value of 100 for comparison purposes. The tire with the experimental tread was tested and its test values compared to the values of the control tire and reported relative to the normalized values of 100.

The tire with the experimental tread rubber composition Y exhibited a lower rolling resistance and higher skid resistance while providing a similar treadwear as compared to control tire X. These results are considered to be an important departure from results which might ordinarily be expected absent the prior experimentation reported herein.

The tread compositions for tires X and Y were comprised of materials shown in the following Table 1.

TABLE 1

| Rubber Compound | Control (X) | Parts[1] Experimental (Y) |
|---|---|---|
| Butadiene/styrene rubber[2] | 50 | 30 |
| Natural rubber | 50 | 55 |
| 3,4-polyisoprene rubber[3] | 0 | 15 |
| Oil, paraffinic/napthenic | 7 | 4 |
| Carbon black (GPT) | 43 | 38 |

[1]Amounts rounded to nearest part.
[2]Solution polymerization prepared SBR obtained as SLF 1216 from The Goodyear Tire & Rubber Company.
[3]Polymer is composed of about 55 percent 3,4 units, about 5 percent 1,2-units and about 40 percent 1,4-units and is the 3,4-polyisoprene described in this specification, particularly of the type shown in Experiment A of TABLE 2 herein. It had a Tg of −18° C.

The rubber compound contained conventional amounts of antioxidant, antiozonant, stearic acid, peptizer, wax, silica and coupling agent, sulfur, accelerator(s) and zinc oxide which are not considered as being the aspect of this invention since the invention is primarily directed to the rubber blend itself.

Table 2 illustrates various characteristics of the 3,4-polyisoprene rubber used in this invention, particularly for Experimental tire Y herein.

TABLE 2

| Product Analysis | Experiment A |
|---|---|
| Molecular Weight (Number Average) | 250,000 |
| Molecular Weight (Weight Average) | 450,000 |
| Glass Transition Temperature | −18° C. |
| Mooney Viscosity (ML1 + 4 at 100° C.) | 80 |

Table 3 illustrates various characteristics of the (Control X) and (Experimental Y) rubber compound.

TABLE 3

| Property | Control X | Exp Y |
|---|---|---|
| 300% Modulus (MN/m²) | 10.5 | 10 |
| Tensile (MN/m²) | 19.2 | 18 |
| Elongation (%) | 510 | 500 |
| Rebound (23° C.) | 46 | 50 |
| Rebound (100° C.) | 64.3 | 67 |
| Autovibron | | |
| Tan Delta (0° C.) | 0.135 | 0.209 |
| Tan Delta (60° C.) | 0.093 | 0.083 |

Table 4 illustrates the rolling resistance, wet skid resistance and treadwear values with the Experimental Tire Y compared to values of Control Tire X normalized to 100.

TABLE 4

| Measured Values | Control X | Experimental Y[1,2] |
|---|---|---|
| Rolling resistance (67" wheel) | 100 | 109 (Improved) |
| Wet skid resistance (20 mph) | 100 | 108 (Improved) |
| Treadwear | 100 | 100 |

[1]a reduction in the Rolling Resistance is represented by an increase in the relative reported value and is considered an improvement.
[2]an increase in the Treadwear value is an improvement.

The rolling resistance was measured by mounting and inflating the tire on a metal rim and allowing it to be turned by a 67 inch diameter dynamometer under about 80 percent of its rated load at a rate equivalent to a vehicular speed of 50 mph and the drag force measured. The test is believed to be somewhat standard.

The skid resistance was a standard test in which the tires are mounted on a weighted, drawn trailer at various speeds and brakes of the trailer applied and skid force (peak and slide) measured.

The treadwear was evaluated as a measure of reduction in tread depth after about 20,000 kilometers of test on an automobile.

The treadwear was compared by actually mounting both control and experimental tires on a vehicle and driving it under controlled conditions, (38 psig inflation) with the position of the tires on the vehicle being maintained while rotated through vehicles.

In this Example, the 3,4-polyisoprene is prepared as hereinbefore reported with hexane as a solvent.

While certain representative embodiments and details have been shown for the purpose of illustrating the invention, it will be apparent to those skilled in this art that various changes and modifications may be made therein without departing from the spirit or scope of the invention.

What is claimed is:

1. A sulfur cured rubber composition composed of, based on 100 parts by weight rubber (phr); (A) about 5 to about 35 parts by weight 3,4-polyisoprene rubber; (B) about 20 to about 60 parts by weight cis 1,4-polyisoprene rubber; and (C) about 10 to about 50 parts by weight of at least one other rubber selected from at least one of solution polymerization formed styrene/butadiene copolymer rubber having a styrene/butadiene ration in the range of about 5/95 to about 30/70, emulsion polymerization formed styrene/butadiene copolymer rubber having a styrene/butadiene ratio in the range of about 10/90 to about 60/40, cis 1,4-polybutadiene rubber, isoprene/butadiene copolymer rubber having an isoprene/butadiene ratio in a range of about 30/70 to about 70/30, styrene/isoprene copolymer rubber having a styrene/isoprene ratio in a range of about 10/90 to about 35/65, and styrene/isoprene/butadiene terpolymer rubber; wherein said 3,4-polyisoprene rubber, in its uncured state, is characterized by having a glass transition temperature (Tg) in the range of about −15° C. to about −20° C., a Mooney (ML1+4) value in the range of about 70 to about 90, and, further, a polymer structure containing about 50 to about 60, 3,4-vinyl isoprene units, about 30 to about 48 percent 1,4-cis and trans units and about 2 to about 10 percent 1,2-isoprene units with the total of its 3,4- and 1,2-units being in the range of about 56 to about 63 percent.

2. The composition of claim 1 comprised of a triblend of (A) about 40 to about 60 phr cis 1,4-polyisoprene natural rubber, about 30 to about 40 phr styrene/- butadiene copolymer rubber and about 5 to about 20 phr of said 3,4-polyisoprene rubber.

3. The blend of claim 2 where said styrene/butadiene copolymer rubber is S-SBR.

4. The composition of claim 1 comprised of a quatra-rubber blend of about 30 to about 50 phr cis 1,4-polyisoprene natural rubber about 20 to about 40 phr cis 1,4-polybutadiene rubber about 10 to about 30 phr isoprene/butadiene copolymer rubber and about 5 to about 15 phr of said 3,4-polyisoprene rubber.

5. The composition of claim 2 where the said 3,4-polyisoprene is substantially incompatible with the remainder of the rubbers of the blend as evidenced by a tan.delta versus temperature curve for said blend exhibiting a tan.delta peak in the region of about −60° C. and a second tan.delta peak in the region of about −20° C. to about +10° C. and where said tan.delta versus temperature curve has a maximization in the range of about −20° C. to about +10° C. and a minimization in the range of about 50° C. to about 60° C.

6. A pneumatic tire having an outer circumferential tread where said tread is a sulfur cured rubber composition composed of, based on 100 parts by weight rubber (phr); (A) about 5 to about 35 parts by weight 3,4-polyisoprene rubber; (B) about 20 to about 60 parts by weight cis 1,4-polyisoprene rubber; and (C) about 10 to about 50 parts by weight of at least one other rubber selected from at least one of solution polymerization formed styrene/butadiene copolymer rubber having a styrene/butadiene ratio in the range of about 5/95 to about 30/70, emulsion polymerization formed styrene/butadiene copolymer rubber having a styrene/butadiene ration in the range of about 10/90 to about 60/40, cis 1,4-polybutadiene rubber, isoprene/butadiene copolymer rubber having an isoprene/butadiene ratio in a range of about 30/70 to about 70/30, styrene/isoprene copolymer rubber having a styrene/isoprene ration in a range of about 10/90 to about 35/65, and styrene/isoprene/butadiene terpolymer rubber; wherein said 3,4-polyisoprene rubber, in its uncured state, is characterized by having a glass transition temperature (Tg) in the range of about −15° C. to about −20° C., a Mooney (ML1+4) value in the range of about 70 to about 90, and, further, a polymer structure containing about 50 to about 60, 3,4-vinyl isoprene units, about 30 to about 48 percent 1,4-cis and trans units and about 2 to about 10 percent 1,2-isoprene units with the total of its 3,4- and 1,2- units being in the range of about 56 to about 63 percent.

7. The tire of claim 6 where said tread rubber is comprised of a tri-blend of (A) about 40 to about 60 phr cis 1,4-polyisoprene natural rubber, about 30 to about 40 phr styrene/butadiene copolymer rubber and about 5 to about 20 phr of said 3,4-polyisoprene rubber.

8. The tire of claim 7 where said styrene/butadiene copolymer rubber is S-SBR.

9. The tire of claim 7 where said styrene/butadiene copolymer rubber is E-SBR.

10. The tire of claim 6 where said tread rubber is comprised of a quatra-rubber blend of about 30 to about 50 phr cis 1,4-polyisoprene natural rubber about 20 to about 40 phr cis 1,4-polybutadiene rubber about 10 to about 30 phr isoprene/butadiene copolymer rubber and about 5 to about 15 phr of said 3,4-polyisoprene rubber.

11. The tire of claim 6 where, int he said tread rubber blend, a tan.delta versus temperature curve has a maximization in the range of about −20° C. to about +10° C. and a minimization in the range of about 50° C. to about 60° C.

12. The tire of claim 11 where, in the said tread rubber blend, the said 3,4-polyisoprene is substantially incompatible with the remainder of the rubbers of the blend as evidenced by a tan.delta versus temperature curve for said blend exhibiting a tan.delta peak in the region of about −60° C. to about −30° C. and a second tan.delta peak in the region of about −20° C. to about +10° C.

13. The tire of claim 12 where the said second tan.delta peak is attributed to the 3,4-polyisoprene rubber and the first tan.delta peak is attributed to the remainder of the rubber mixture.

14. A pneumatic rubber tire of claim 6 having a sulfur cured rubber tread where said rubber is comprised of (A) about 10 to about 25 phr of the said 3,4-polyisoprene; (B) about 40 to about 55 phr of said natural rubber; and (C) about 10 to about 50 phr of at least one of isoprene/butadiene copolymer rubber and styrene/butadiene rubber, and cis 1,4-polybutadiene rubber.

15. The tire of claim 14 where said styrene/butadiene rubber is S-SBR.

16. The tire of claim 14 where the 3,4-polyisoprene rubber has a structure containing about 50 to about 60 percent 3,4-vinyl isoprene units.

* * * * *